United States Patent [19]

Wright

[11] Patent Number: 4,757,684

[45] Date of Patent: Jul. 19, 1988

[54] FAIL-SAFE ELECTRIC ACTUATOR

[76] Inventor: John J. Wright, 9 Hix Ave., Rye, N.Y. 10580

[21] Appl. No.: 252,022

[22] Filed: Apr. 8, 1981

[51] Int. Cl.[4] ............................................ F15B 15/12
[52] U.S. Cl. ........................................ 60/404; 60/328; 60/371; 60/413; 60/911; 251/59; 251/71
[58] Field of Search ............. 60/328, 371, 403, 404, 60/413, DIG. 2, 414; 415/123; 188/162; 251/134, 136, 133, 59, 71; 91/42, 44

[56] References Cited

U.S. PATENT DOCUMENTS

| | | | |
|---|---|---|---|
| 3,279,744 | 10/1966 | Fieldsen et al. | 251/71 |
| 3,430,916 | 3/1969 | Raymond, Jr. | 251/71 |
| 3,572,032 | 3/1971 | Terry | 60/404 |
| 3,752,041 | 8/1973 | Smith | 251/59 |
| 3,753,350 | 8/1973 | Nott | 60/403 |
| 3,808,895 | 5/1974 | Fitzwater | 251/71 |
| 4,246,753 | 1/1981 | Redmond | 60/DIG. 2 |

*Primary Examiner*—Deborah L. Kyle
*Assistant Examiner*—Richard Klein
*Attorney, Agent, or Firm*—James M. Heilman

[57] ABSTRACT

A fail-safe electric actuator, for use with a control mechanism such as a valve, is disclosed. The actuator device eliminates the possibility of the control mechanism being locked in operative position by the interruption of electric power, by automatically and mechanically returning the control mechanism to its inopertive position as soon as current is cut off. This is accomplished by the release of a torsion spring, wound previously by the rotation of a fluid-driven vaned torque actuator in turning both the control-mechanism and the electric fail-safe actuator into operative position.

10 Claims, 2 Drawing Sheets

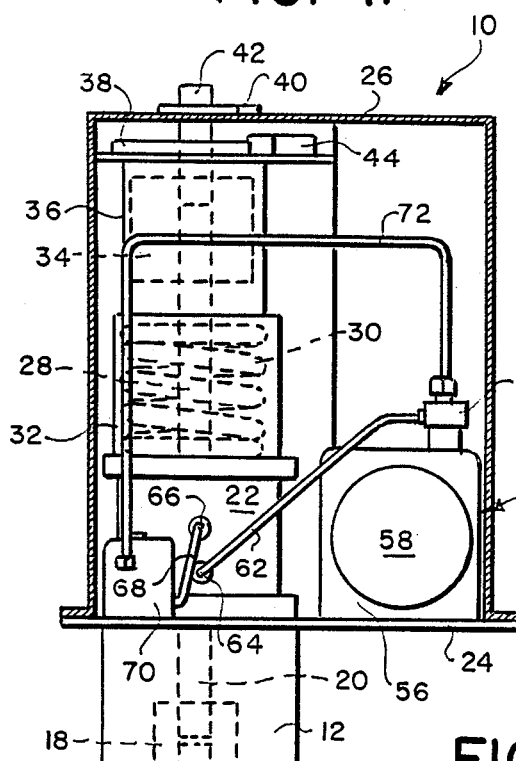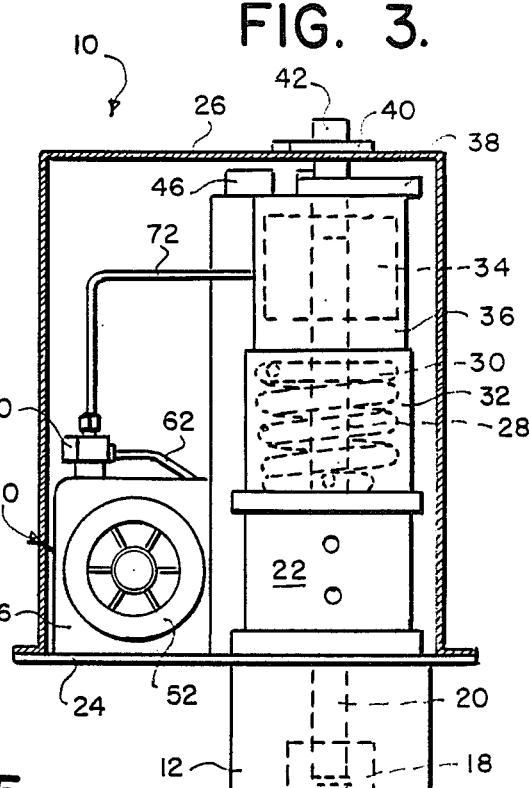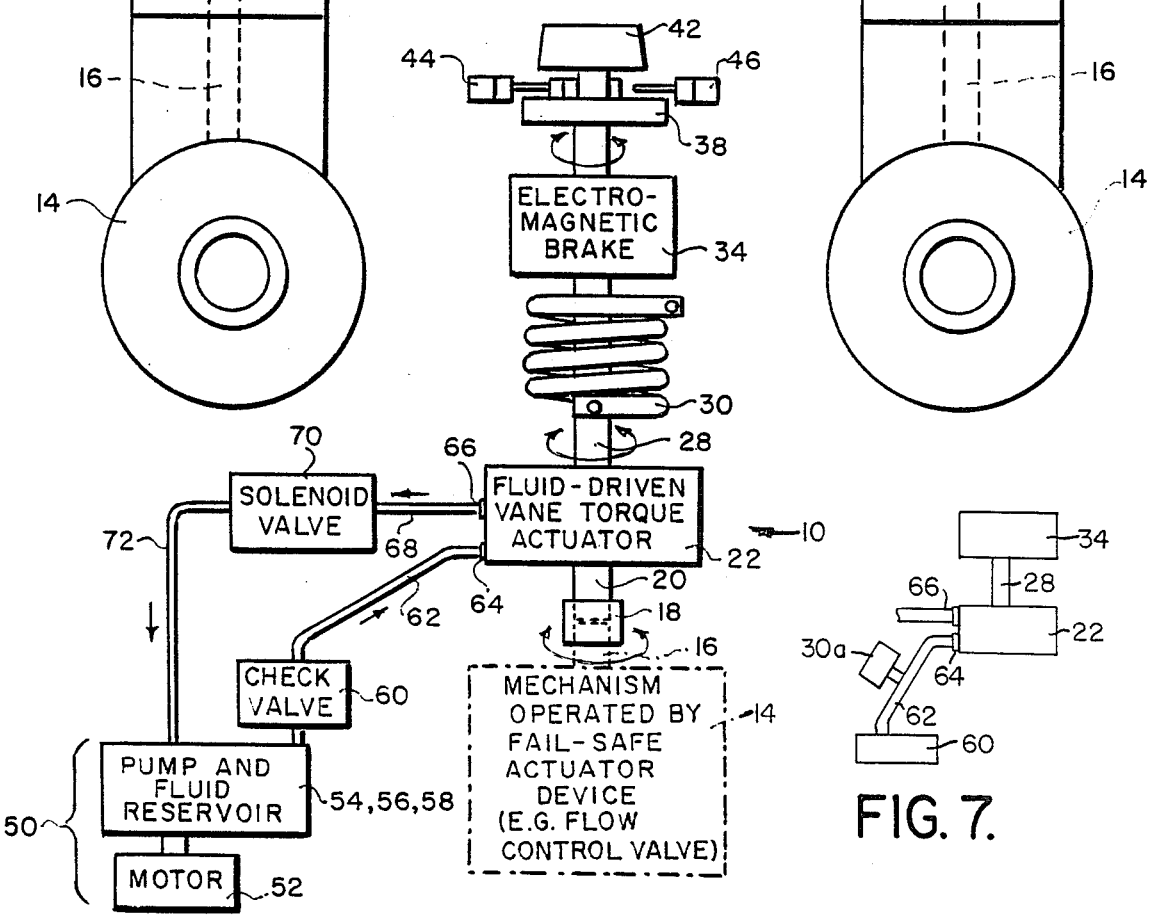

FAIL-SAFE ELECTRIC ACTUATOR

BACKGROUND OF THE INVENTION

Many situations exist where electrically operated control mechanisms, such as valves, dampers and the like, if locked in an operative position by an interruption of electric power, can create awkward, difficult, and even hazardous conditions. Endless examples of fluid or fuel control valves used universally in equipment on land and at sea may be cited, as, for example, oil storage farms and pipe lines, ship steering mechanism, etc.

Applicant is unaware of any truly satisfactory answer to this problem in the prior art, and has created a fail-safe electric actuator which, on loss of electric power, instantly and automatically returns the control mechanism which it monitors to inoperative position (either open or closed).

SUMMARY OF THE INVENTION

The fail-safe electric actuator device of this invention comprises a fluid-driven vaned torque actuator, having a shaft operatively connected to the control mechanism being operated. The torque actuator is rotated in one direction (setting the fail-safe actuator and putting the control mechanism in operative position) by an electric motor-driven fluid power generator or pump, with a normally open solenoid valve interposed in the fluid line between the torque actuator and the fluid power generator or pump. The shaft of the torque actuator operatively carries an electromagnetic brake, a strong torsion spring, and a limit-switch-operating cam.

When electric current is turned on, the motor-driven fluid power generator pumps fluid to the torque generator and rotates its shaft until a limit switch is tripped; at this point, the control mechanism is in operative position, and the fail-safe actuator device is set, poised to monitor the presence of electric current—the fluid-power generator or pump has been turned off, the electromagnetic brake is applied to the shaft, the now closed solenoid valve locks the fluid system and hence the torque actuator; and the torsion spring has been wound, storing energy. At any interruption of the electric current supply, the solenoid valve and the electromagnetic brake are released, permitting the torsion spring (an accumulator or equivalent) to unwind, returning the torque actuator shaft and hence the control mechanism and the fail-safe actuator device to their initial inoperative position.

The fail-safe electric actuator of this invention may be adapted for use with ball valves, plug valves butterfly valves, switches, dampers, louvres and in various automated systems. Several options on, and additions to the basic elements of this device are contemplated and all are now disclosed in greater detail in connection with the accompanying drawing, wherein:

DRAWINGS

FIG. 3 is a front elevational view of the fail-safe device, the cover being in section;

FIG. 4 is a rear elevational view, the cover being in section;

FIG. 5 is a schematic representation of the main operating components of the fail-safe actuator mechanism;

FIG. 7 is similar to FIG. 5 but with a conventional accumulator instead of a spring supplying the return power.

DESCRIPTION OF THE PREFERRED EMBODIMENTS

Figure 1:
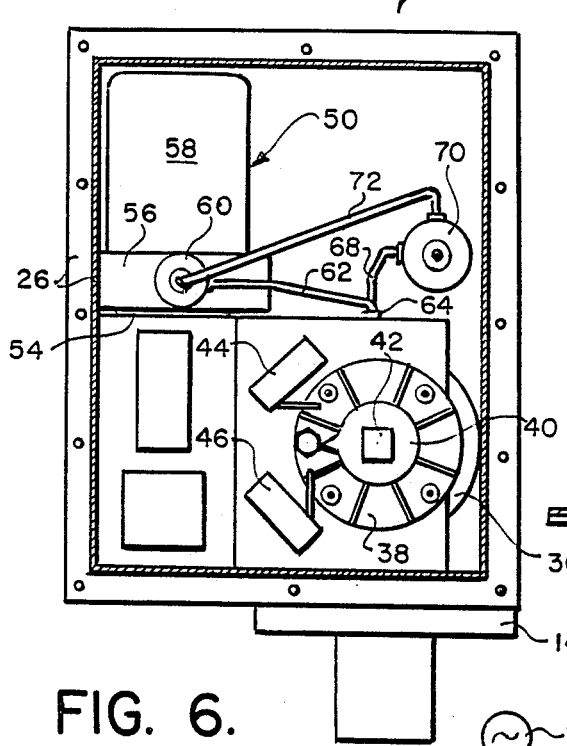
FIG. 1 is a top plan view of the fail-safe electric actuator of this invention, the cover being broken away and in section.
Figure 2:
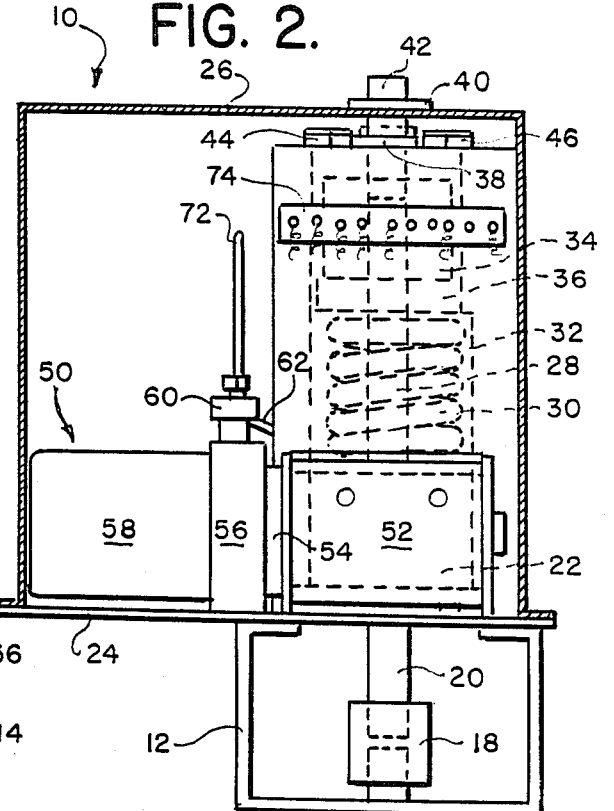
FIG. 2 is a side elevational view, looking from the left side of FIG. 1, the cover being in section.

As illustrated, the novel fail-safe electric actuator of this invention, generally designated 10, has a bracket 12 mounted on and supported by the mechanism to be operated by device 10, in this case, valve 14. Valve stem 16, the rotation of which opens and closes valve 14, is operatively connected by coupling 18 to vertically disposed lower shaft 20 of fluid-driven rotary torque actuator 22.

Torque actuator 22, either hydraulically or pneumatically operated, may be single-vaned, with a rotation of 280 degrees, or double-vaned, with a rotation of 100 degrees. Suitable actuators of these types are available under the trade mark "Tork-Mor" from the Rotor Actuator Corporation, 23919 Little Mack, St. Clair Shores, Mich. 48080. Obviously, equivalent equipment could be substituted herein for the specific items mentioned.

Torque actuator 22 is supported on mounting plate 24, which carries all components of fail-safe device 10, suitably enclosed by cover 26. Atop actuator 22 and encompassing upper actuator shaft 28 and its extension are heavy-duty torsion spring 30 surrounded by its housing 32; electromagnetic brake 34 contained in its housing 36; limit-switch-operating cam 38; and, above device cover 26, position-indicator 40, surmounted by manual override control knob 42. Limit switches 44 and 46 are positioned to be tripped by cam 38 at opposite ends of the rotational movement of actuator 22, shafts 20 and 28 and valve stem 16, which all rotate together.

Electromagnetic brake 34 as used in device 10 is identified, for example, as part number 5200 101 009, obtainable from Warner Electric Brake & Clutch Company, Beloit, Wisc. 53511.

Mounting plate 24 also supports fluid power unit 50, available as one of the 120 Model Series from Oildyne Inc. 4301 Quebec Avenue North, Minneapolis, Minn. 55428. Unit 50 comprises single-direction motor 52, pump 54, adapter 56 and fluid reservoir 58. Fluid output from power unit 50, when operating, passes through check valve 60 and conduit 62 to entrance port 64 of torque actuator 22, which, by the rotation of its vane(s), forces fluid from exit port 66 through conduit 68, through normally open solenoid valve 70 and conduit 72, returning the fluid to pump reservoir 58.

Figure 6:
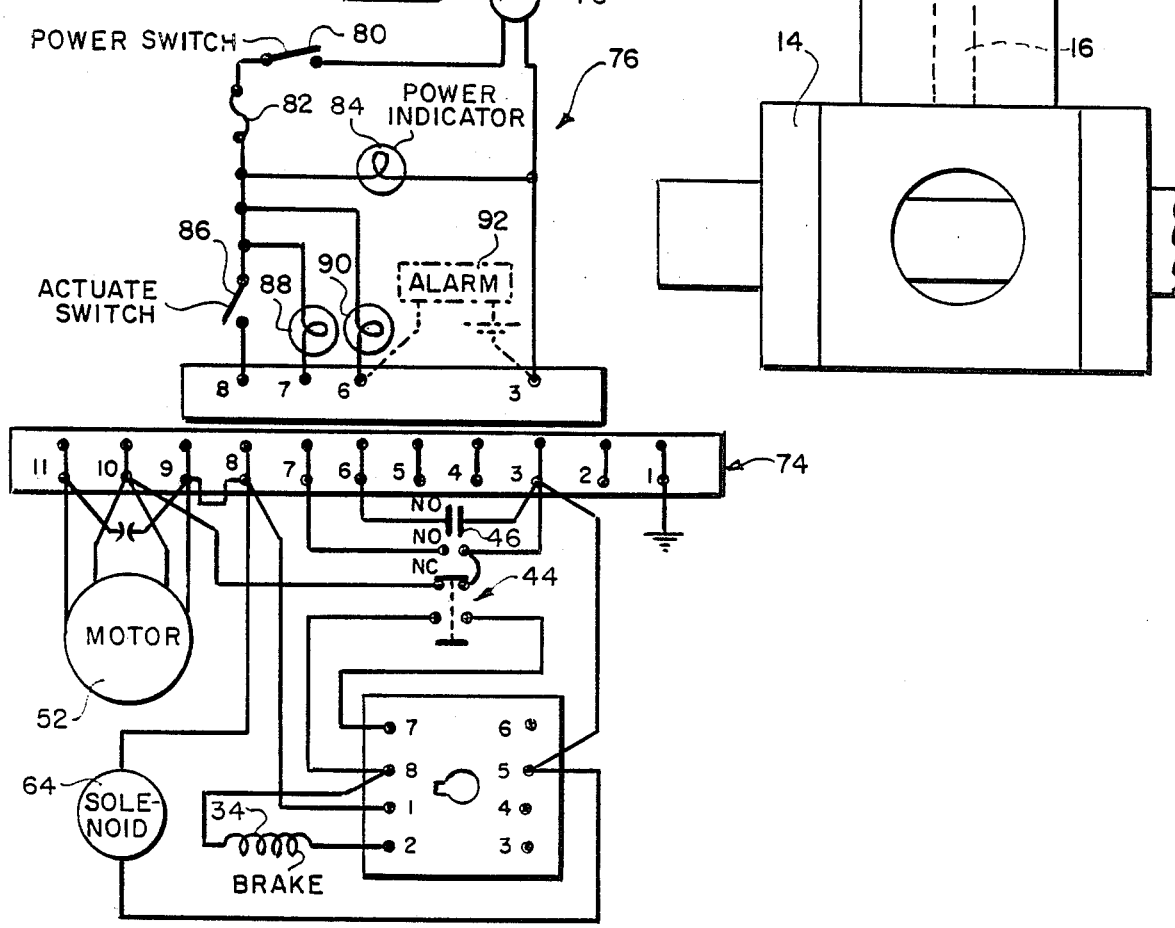
FIG. 6 is a wiring diagram thereof.

The wiring diagram of FIG. 6 shows the electrical connections of the components of fail-safe device 10 described above to the terminal bus board 74, as well as those of power-supply and indicator circuit 76. As illustrated, circuit 76 includes power source 78, power on-off manual switch 80, fuse 82, power-indicator lamp 84, manual actuate switch 86, actuated signal light 88, and not-actuated signal light 90. Optionally, additional alarm circuit 92 may be provided.

OPERATION OF FAIL-SAFE DEVICE 10

Initially, the mechanism to be operated by fail-safe device 10, illustrated as valve 14, is in inoperative position (may be either open or closed) and device 10 is unset.

When power switch 80 and actuate switch 86 are closed electric power is provided to energize motor 52 and normally open solenoid valve 70. Motor 52 operates fluid pump 54, drawing from reservoir 58 and sending fluid through check valve 60 (to prevent reverse flow), through conduit 62 into entrance port 64 of rotary torque actuator 22, the vane or vanes of which are rotated by fluid pressure. It may be noted that in the accompanying drawings, the elements of device 10 are arranged for this first rotation to be clockwise; obviously this may be reversed, if desired. The rotation of torque actuator 22: turns valve stem 16 (through shaft 20 and coupling 18) thus putting valve 14 in operative position; rotates shaft 28 and thus winds torsion spring 30 (storing energy) and turns electromagnetic brake 34 as well as limit-switch-operating cam 38. For space conservation, a flat clock type spring could be substituted for spring 30, or even an accumulator 30a having reserve power. Suitable conventional accumulators of these types are available from Robert Bosch Corporation, Greer Hydraulics, York Industries, Inc. and others.

Valve 14 is in fully operative position at the point of rotation when cam 38 trips limit switch 44, which action: (1) applies electromagnetic brake 34 to lock shaft 28 in place; (2) closes normally open solenoid valve 70, thereby locking the fluid pressure system and hence torque actuator 22; (3) shuts off power to motor 52; and (4) activates signal light 88.

Fail-safe device 10 is now set and in position to function if an interruption of power supply occurs or a command signal (e.g., opening switch 80 or switch 86) is given. In either case, a power shut-off opens solenoid valve 70, releasing the fluid pressure on torque actuator 22 and permitting the fluid to flow freely back to reservoir 58; at the same time, electromagnetic brake 34 is released. With these restraints removed, torsion spring 30 unwinds, (or accumulator, if used empties), rotating shaft 28, torque actuator 22, and valve 14 back to their initial positions. Limit-switch-operating cam 38 is also returned so that it trips second limit switch 46, activating signal light 90 or alarm 92.

In this way, fail-safe device 10, on any power interruption, returns controlled mechanism 14 to its original inoperative position automatically, avoiding any difficulty or danger of valve mechanism 14 being inadvertently locked in its operative position. It will be evident to those skilled in the art that modification of, and substitutions for, the components and electric circuitry are possible without departing from the basic concepts of this invention—for example, fail-safe device 10 may be wired to reset itself automatically when electric power is restored after an interruption, or, if desired, to require a specific resetting procedure.

As mentioned above, my actuator may be used in innumerable mechanisms, among which are oil storage farms, pipe lines, ship steering mechanisms, etc.

The best mode now contemplated of carrying out this invention has been described; the scope of this invention is defined by the ensuing claims.

What is claimed is:

1. In combination with a control mechanism characterized by the ability to be moved from inoperative to operative position and back, a fail-safe actuator device for automatically returning the control mechanism to inoperative position when interruption of electric power occurs, which comprises:
   a fluid-driven vaned torque actuator;
   electric-motor-driven fluid power means for operating said torque actuator;
   electrically operated valve means for controlling the power fluid flow between said torque actuator and said fluid power generating means:
   at least one shaft projecting from said torque actuator;
   coupling means for operatively connecting said shaft to the control mechanism to be operated by the failsafe actuator device;
   reversible means for storing energy, said reversible means being operatively connected to said shaft;
   a limit-switch operating cam mounted on and rotatable with said shaft;
   a limit switch positioned for activation by said limit-switch operating cam; and
   electric circuitry means for interconnecting said motor-driven fluid power generating means, said valve means, and said limit switch, so that when electric power is applied to said circuitry means, said motor-driven fluid power generating means are energized and power fluid is delivered to said torque actuator, thereby rotating said torque actuator, said shaft, and the control mechanism to operative position, at the same time storing energy in said reversible energy-storage means: when said limit switch is activated said motor-driven fluid power means is deenergized and stopped, said valve means is closed to lock said torque actuator in place; and when electric power supply is interrupted, said valve means is deenergized and opened, permitting energy stored in said reversible means to return said shaft, thereby restoring the failsafe actuator device and the control mechanism to their initial inoperative position.

2. In combination with a control mechanism characterized by the ability to be moved from inoperative to operative position and back by rotational force, a fail-safe actuator device for automatically returning the control mechanism to inoperative position when interruption of electric power occurs, which comprises:
   a fluid-driven vaned torque actuator;
   electric-motor-driven fluid power means for operating said torque actuator;
   electrically operated valve means for controlling the power fluid flow between said torque actuator and said fluid power generating means;
   at least one shaft projecting from and rotated by said torque actuator;
   coupling means for operatively connecting said shaft to the control mechanism to be operated by the fail-safe actuator device;
   an electromagnetic brake for immobilizing said shaft and said torque actuator;
   reversible means for storing energy mechanically produced by the rotation of said torque actuator, said reversible means being operatively connected to said shaft;
   a limit-switch-operating cam mounted on and rotatable with said shaft;
   a limit switch positioned for activation by said limit-switch operating cam; and
   electric circuitry means for interconnecting said motor-driven fluid power generating means, said valve means, said electromagnetic brake, and said limit switch, so that when electric power is applied to said circuitry means, said motor-driven fluid power generating means are energized and power fluid is delivered to said torque actuator, thereby rotating said torque actuator, said shaft, said electromagnetic brake, said limit-switch-operating cam and the control mechanism to operative position, at the same time storing mechanical energy in said reversible energy-storage means; when said limit switch is activated by the rotation of said limit-switch-operating cam, said motor-driven fluid power means is deenergized and stopped, said valve means is closed to lock said torque actuator in place, and said electromagnetic brake is energized to lock on said shaft; and, when electric power supply is interrupted, said valve means and said electromagnetic brake are deenergized and opened, permitting the mechanical energy stored in said reversible means to return said shaft, thereby restoring the fail-safe actuator device and the control mechanism to their initial inoperative position.

3. A fail-safe actuator device in accordance with claim 1, wherein said torque actuator is double-shafted, with one of said shafts operatively connected to the control mechanism by said coupling means, the oppositely projecting said shaft being operatively connected to said electromagnetic brake, to said reversible means for storing energy, and to said limit-switch-operating cam.

4. A fail-safe actuator device in accordance with claim 1, wherein said reversible means for storing energy mechanically is a torsion spring.

5. A fail-safe actuator device in accordance with claim 1, which further comprises:

a second limit switch, positioned to be activated by said limit-switch-operating cam when the fail-safe device, after power interruption, is returned to its initial position, the activation of said second limit switch closing an indicator-alarm circuit.

6. In operative connection with pipe lines for oil storage facilities, a fail-safe actuator device in accordance with claim 5.

7. In operative connection with a ship's steering mechanism, a fail-safe actuator in accordance with claim 1.

8. A fail-safe actuator device in accordance with claim 1, wherein said electric-motor-driven fluid power generating means comprises:
 a fluid pump;
 a unidirectional motor for driving said pump;
 a fluid reservoir; and
 a check valve positioned at the outlet of said pump to prevent reverse fluid flow, and said valve means to lock said torque actuator in place is positioned in the inlet connection to said fluid power generating means and comprises a normally open solenoid valve.

9. A fail-safe actuator device in accordance with claim 8, wherein said torque actuator comprises a plurality of vanes secured to said shaft to force rotation thereof when said fluid power generating means are energized.

10. A fail-safe actuator device in accordance with claim 1, wherein said torque actuator comprises at least one vane secured to said shaft to force rotation thereof when said fluid power generating means are energized.

* * * * *